United States Patent [19]
Nightingale et al.

[11] Patent Number: 5,627,942
[45] Date of Patent: May 6, 1997

[54] TRAINABLE NEURAL NETWORK HAVING SHORT-TERM MEMORY FOR ALTERING INPUT LAYER TOPOLOGY DURING TRAINING

[75] Inventors: Charles Nightingale, Felixstowe; Peter J. Wyard, Woodbridge, both of England

[73] Assignee: British Telecommunications public limited company, London, England

[21] Appl. No.: 867,698

[22] PCT Filed: Dec. 21, 1990

[86] PCT No.: PCT/GB90/02006

§ 371 Date: Jul. 7, 1992

§ 102(e) Date: Jul. 7, 1992

[87] PCT Pub. No.: WO91/10196

PCT Pub. Date: Jul. 11, 1991

[30] Foreign Application Priority Data

Dec. 22, 1989 [GB] United Kingdom ............ 8929146

[51] Int. Cl.$^6$ .................................................. G06F 15/00
[52] U.S. Cl. ............................ 395/23; 395/20; 395/24
[58] Field of Search ................................ 395/23, 24, 20

[56] References Cited

U.S. PATENT DOCUMENTS

| | | | |
|---|---|---|---|
| 4,912,647 | 3/1990 | Wood | 395/23 |
| 4,941,122 | 7/1990 | Weideman | 395/22 |
| 4,974,169 | 11/1990 | Engel | 395/24 |
| 4,979,126 | 12/1990 | Pao et al. | 395/24 |
| 5,003,490 | 3/1991 | Castelaz et al. | 395/22 |
| 5,046,020 | 9/1991 | Filkin | 395/23 |
| 5,095,443 | 3/1992 | Watanabe | 395/23 |
| 5,107,454 | 4/1992 | Niki | 395/23 |
| 5,119,469 | 6/1992 | Alkon et al. | 395/23 |
| 5,129,039 | 7/1992 | Hiraiwa | 395/24 |
| 5,140,530 | 8/1992 | Guba et al. | 395/23 |
| 5,327,541 | 7/1994 | Reinecke et al. | 395/400 |
| 5,339,818 | 8/1994 | Baker et al. | 395/924 |

FOREIGN PATENT DOCUMENTS

| | | |
|---|---|---|
| 0327817 | 8/1989 | European Pat. Off. . |
| 2238560 | 9/1990 | Japan . |
| 89/02134 | 3/1989 | WIPO . |

OTHER PUBLICATIONS

Tsung, et al, "A Sequential Adder Using Recurrent Networks", Proceedings of the International Joint Conference on Neural Networks, 1989, 11-133-11-139.

Rumelhart, D.E. et al, (1986) "Schemata and Sequential Thought Processes in PDP Models", Parallel Distributed Processing 2, McClelland, J.L. and Rumelhart, D.E. (Eds.) Cambridge, Massachusetts: MIT Press.

Rumelhart et al, (1986) "On Learning the Past Tenses of English Verbs", Parallel Distributed Processing. 2, McClelland, J.L. and Rumelhart, D.E. (Eds.), Cambridge, Massachusetts: MIT Press.

McClelland et al. (1986), "Mechanisms of Sentence Processing: Assigning Roles to Constituents of Sentences", Parallel Distributed Processing. 2, McCelland, J.L. and Rumelhart, E.D. (Eds.), Cambridge, Massachusetts: MIT Press.

Alonso et al, "Machine Translation Technology: On the Way to Market Introduction", International Journal of Computer Applications In Technology, pp. 186–190.

Hutchinson et al, British Telecom Research Laboratories, UK, Comparison of Neural Networks and Conventional Techniques for Feature Location in Facial Images, pp. 201–205.

(List continued on next page.)

Primary Examiner—George B. Davis
Attorney, Agent, or Firm—Nixon & Vanderhye P.C.

[57] ABSTRACT

A neutral net in which new nodes and connections are created in both input and intermediate layers during training, which is by punishment, reward and teaching. This can use a small increase in memory requirement to preclude the necessity for long training times applicable problems in speech and natural language processing, video recognition and simple logic functions.

17 Claims, 6 Drawing Sheets

OTHER PUBLICATIONS

Saerens et al, A Neural Controller, Universite Libre de Bruxelles, Belgium, pp. 211–215.

Jagota et al., Dept. of Computer Science, State University of New York Buffalo, N.Y. 14260, Knowledge Representation in a Multi–Layered Hopfield Network, pp. I–435–I–442.

Lynch et al, Cambridge University, U.K., "The Properties and Implementation of the Non–Linear Vector Space Connectionist Model", pp. 186–190.

Rumelhart et al, "Feature Discovery by Competitive Learning", Chapter 5, pp. 151–193, Cognitive Science, 1985.

Rumelhart et al, "Learning Internal Representations by Error Propagation", Chapter 8, pp. 318–362.

Sharkey, Centre for Connection Science, Department of Computer Science, University of Exeter, Exeter EX44PX, UK, "A PDP Learning Approach to Natural Language Understanding", pp. 92–116.

Slocum, Microelectronics and Computer Technology Corporation (MCC), Austin, Texas, "A Survey of Machine Translation: Its History, Current Status, and Future Prospects", pp. 1–47.

Weber, Department of Computer Science, University of Rochester, Rochester N.Y. 14627, "A Connectionist Model of Conceptual Representation", pp. I–477–I–483.

Woodland et al, "An Experimental Comparison of Connectionist and Conventional Classification Systems on Natural Data", Speech Communication 9 (1990) 73–82.

Wyard et al, "A single Layer Higher Order Neural Net and Its Application to Context Free Grammar Recognition", Connection Science, vol. 2, No. 4, 1990, pp. 347–371.

*IEEE International Conference on Neural Networks,* San Diego, California, Jul. 24–27, 1988, S. Nolfi et al: "Learning to Understand Sentences in a Connectionist Network," pp. 215–219.

*IEEE International Conference on Neural Networks,* San Diego, California, 24–27 Jul. 1988, M.F. Tenorio et al: "Adaptive Networks as a Model for Human Speech Development," pp. 235–242.

*Neural Networks from Models to Applications,* Paris, 1988, Ekeberg et al: "Automatic Generation of Internal Representations in a Probabilistic Artificial Neural Network," pp. 178–186.

*IJCNN International Joint conference on Neural Networks,* Washington, 19–22 Jun. 1989, T. Matsuoka et al: "Syllable Recognition Using Integrated Neural Networks," pp. 251–258.

*Neuro–Nimes' 89, Nimes,* 13–16 Nov. 1989, P. Meiler: "Garbled Text String Recognition with a Spatio–Temporal Pattern Recognition (SPR) Neural Network," pp. 279–292.

Rumelhart et al, "Parallel Distributed Processing", vol. 1, 1986, pp. 201–219.

Wasserman et al, "Neural Computing, Theory and Practice", pp. 167–185, Apr. 1989.

TRAINABLE NEURAL NETWORK HAVING SHORT-TERM MEMORY FOR ALTERING INPUT LAYER TOPOLOGY DURING TRAINING

BACKGROUND OF THE INVENTION

1. Field of the Invention

This invention relates to (artificial) neutral networks (in other words, to parallel processing apparatus comprising or emulating a plurality of simple, interconnected, neural processors, or to apparatus arranged to emulate parallel processing of this kind) and particularly, but not exclusively, to their use in pattern recognition problems such as speech recognition, text-to-speech conversion, natural language translation and video scene recognition.

2. Related Art

Figure 1:
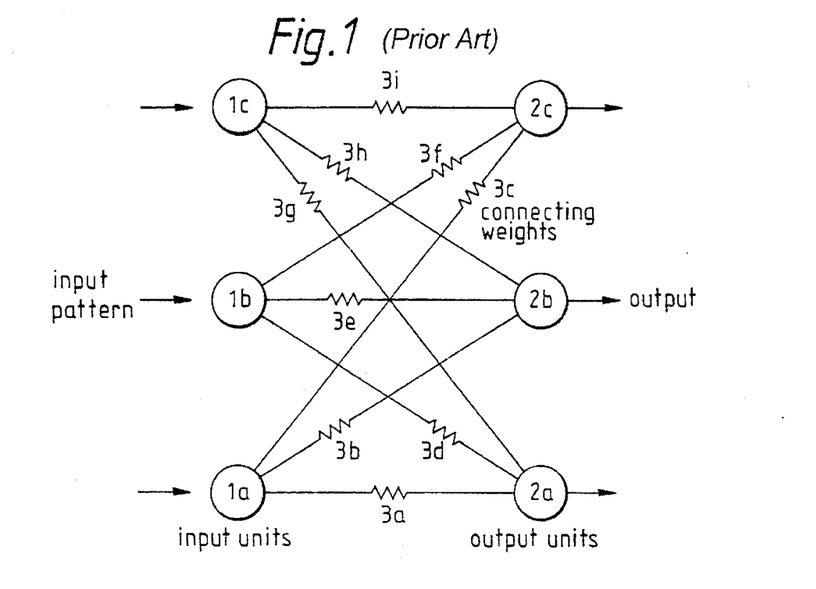
FIG. 1 shows schematically a general (prior art) neural net.

Referring to FIG. 1, one type of generalized neural net known in the art comprises a plurality of input nodes $1a$, $1b$, $1c$ to which an input data sequence is applied from an input means (not shown), and a plurality of output nodes $2a$, $2b$, $2c$, each of which produces a respective net output signal indicating that the input data sequence satisfied a predetermined criterion (for example, a particular word or sentence is recognized or an image corresponding to a particular object is recognized). Each output node is connected to one or more nodes in the layer below (the input layer) by a corresponding connection including a weight $3a$–$3i$ which scales the output of those nodes by a weight factor to provide an input to the node in the layer above (the output layer). Each node output generally also includes a non-linear (compression) stage (not shown).

In many such nets, further intermediate inner or 'hidden' layers are included, which receive inputs from a layer below and generate outputs for a layer above. The output of a node in general is a function of its weighted inputs; typically the function is the sum of these inputs, with the subsequent non-linear compression mentioned above. One example of such a net is the well known Multi-Layer-Perceptron (MLP).

Such nets are trained in a training phase by inputting training data sequences which are known to satisfy predetermined criteria, and iteratively modifying the weight values connecting the layers until the net outputs approximate the desired indications of such criteria. Having been trained on a range of training data, it is then found that such trained networks can operate upon real-world data to perform various processing and recognition tasks.

Since the revival of interest in neural nets in recent years such attention has focussed on nets in which processing is unequivocally parallel and distributed, (Rumelhart 1986) and which have recently proved to be admirably suited to tackling problems in signal processing eg (Lynch & Rayner 1989) pattern recognition eg (Hutchinson & Welsh 1989) (Woodland & Smythe 1990) and robotic control eg (Saerens & Soquet 1989). Some attention has also been paid to problems which cannot be seen as signal processing, and in particular various methods of applying neural nets to natural language have been described, from (Rumelhart 1986) and (McClelland & Kawamoto 1986) through to recent papers and reports (Sharkey 1989) , (Weber 1989) and (Jagota & Jajubowitz 1989). A difficulty in these cases is how to present inputs to the net. If unlimited data such as text is to be processed by a neural net of these kinds, either it must be input as some set of lower level features—letters or microfeatures as described in eg (Rumelhart et al 1986), —or if whole words or larger features are to be used the number of input nodes must be very great. In the latter case, too, some retreat from the pure concept of parallel distributed processing must be accepted, since each word can be seen as locally stored.

In other words, the choice is typically between using too few nodes (in which case the network may not train well if features chosen are inappropriate) or too many (in which case the network is tending to act as a simple look up store).

Another problem is that a very large number of iterations can be required for convergence in training, which can consequently be slow and laborious.

In their paper entitled "Learning to understand sentences in a connectionist network", published in the proceedings of the IEEE International Conference on Neural Networks, San Diego, 24–27 Jul. 1988, pages II 215 to II 219, Nolfi and Paris; describe a "Jordan Architecture" net which is trained by back propagation. The net is a kind of multi-layer perceptron in which there are input units, output units and hidden units. Associated with each hidden unit is a corresponding memory unit. Each memory unit makes a temporary copy of each state of its associated hidden unit and then supplies this copy to the hidden unit in the next cycle (when the system processes the next stimulus).

The memory units only store information temporarily. The information stored in the memory units does not appear to correspond to the "new features" specified herein. The information stored in the memory units is not used to modify the input layer in any way.

In another paper at the same conference, at pages II 234–242, Tenorio et al discuss the NETtalk system applied to Spanish and English. In paragraph 5.2 of that paper they discuss the effects of using networks having difference numbers of hidden units. Unsurprisingly, when the network has very many hidden units (there being at least as many hidden units as there are training patterns), rather than only a few, there is a dramatic change in the performance in the back propagation algorithm. With many hidden units the network can of course operate as what is effectively a look up table. There is no suggestion either that there is an optimum number of hidden units or that the number of hidden units in a particular network should be altered dynamically or in any other way.

Ekeberg, in a paper entitled "Automatic generation of internal representations in a probabilistic artificial neural network", published in "Neural Networks from Models to Applications", I.D.S.E.T. Paris 1989, at pages 178 to 186, considers adding layers and features to what is initially a single layer feedback perceptron type network. Higher level features code for suitable combinations of simultaneously input unit activity. The higher level features are present in a separate layer, communicating through connections with the input/output layer. Initially the internal layer contains one unit for each in/out unit, that is the internal code is initially the same as the external. During training, the internal layer is gradually transformed by replacing existing units with units coding higher order co-activity in the In/Out layer. Ekeberg describes how the appropriate internal units are chosen: he selects the two internal units with the highest interdependency and replaces them with three more specific ones, one being active when both of the old ones were, and each of the other being active when only one was active. After such a replacement, the sample patterns are scanned again to get estimates of the new probabilities involved. This process of replacing two internal units by three is repeated until the task is solved. In the worst case, when no useful regularities are detected, so-called "Grandmother cells" corresponding to the individual training patterns will develop.

Thus the network grows into what is effectively a look-up table, which of course is very memory intensive. Ekeberg states that in the normal case, however, a successful representation emerges much sooner.

Ekeberg does not suggest either the possibility or desirability of limiting the replacement of units for the normal case. Ekeberg is also silent as to whether or how the creation of "grandmother cells" can be limited or inhibited with or without any deterioration of the "normal case" performance.

In EP 0327817 there is described an associated pattern conversion system in which, during training, connection weights are adjusted between pre-determined, fixed maximum and minimum values. The maxima and minima are fixed in advance, and preferably with only a small range between them, in order that a simple circuit can be used. When a weight reaches its pre-determined maximum or minimum, it is said to be saturated. The weight modification function is a monotonically decreasing function. There is no suggestion of adding internal nodes or modifying the input layer to be responsive to new features derived from higher level features.

BRIEF SUMMARY OF THE INVENTION

According to a first aspect the invention provides a trainable artificial neural network comprising: input means for receiving an input signal; input layer means responsive to the occurrence in said signal of predetermined features to generate corresponding node outputs; and output layer means, responsive to the generation of said node outputs to produce at least one output, each output being a function of a plurality of such node outputs weighted by corresponding weight values; characterised by: means for storing data derived from the input signal which does not correspond to said predetermined features to which the input layer is responsive; and by means for altering said input means to be responsive to new features derived from the stored data and corresponding thereto.

The nets it creates use extra memory (or nodes) to deal with difficult training tasks, in preference to long training programs. Even so the memory used is not excessive, as restraints are preferably placed upon the nets propensity to create new nodes.

Other aspects and embodiments of the invention are as recited in the appended claims, or as described hereafter.

BRIEF DESCRIPTION OF THE DRAWINGS

The invention will now be described by way of example only, with reference to the accompanying drawings in which:

FIG. 4 shows schematically a method of training the net of FIGS. 2a–2d, FIGS. 5a and 5b show schematically a weight modification function according to one aspect of the invention.

DETAILED DESCRIPTION OF EXEMPLARY EMBODIMENTS

Figure 2A:
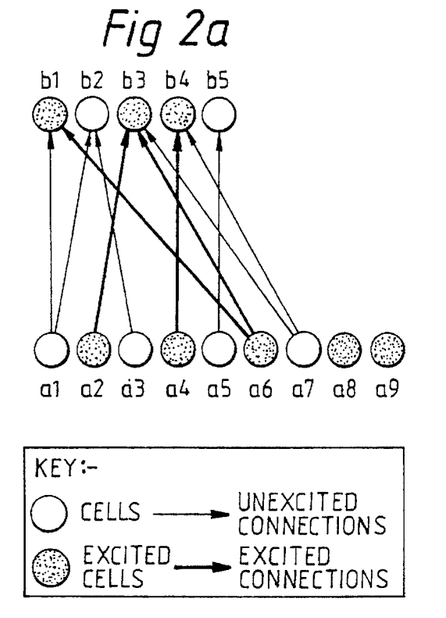
FIGS. 2a, 2b, 2c and 2d show schematically the structure of a net according to one aspect of the invention during subsequent stages of training.
Figure 3:
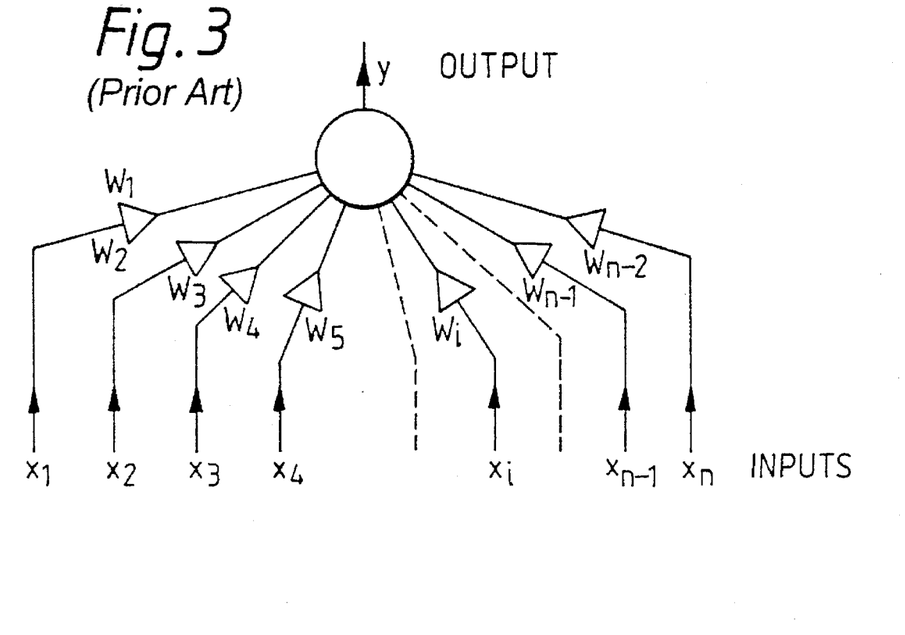
FIG. 3 shows schematically a general (prior art) output or intermediate node of a neural net.

Referring to the drawings, in a simple example, when the net starts its training phase it may consist of only a single output node which fires in response to any input. As it receives new and unfamiliar inputs, the net instantiates new nodes as necessary each responsive to a feature found in the input data. Therefore after the simple form of the invention has been running for some time it will consist of a layer of input nodes, connected by a set of connections to a single layer of output nodes, as shown in FIG. 2a. The connections from input to output do not exist between every input/output pair, but each connection possesses a weight. Input signals may comprise, for example, text, speech or video data. In an example where the input consists of text entities, if words are detected as the lowest level features, then a complete training phase input data sequence could be a phrase or sentence. Each node in the input corresponds (i.e. produces an output in response) to some feature of an input sequence that has been applied to the net previously, and when a new input data sequence is applied which includes some of these low-level features, these nodes will become excited. Any data representing unknown low-level features contained in the input thus play no part in the determination of the output of the net. Such data are however retained in short term memory during the subsequent cycles of connection-weight modification, and are ultimately connected to some appropriate output so as to form a new input node. Each output node is a typical neural processor, as shown in FIG. 3 in which the excitation is given by Eqn. 1.

$$y = \sum_{i=1}^{n} w_i x_i \quad (1)$$

No nonlinear activation function as such appears here, but a competitive algorithm, which ensures that a notional thresholding operation occurs which is automatically set to cut off all but the strongest firing output cell, fulfills the same function (a nonlinear function could, however, be used).

The algorithm works, in a simple single-layer mode, by following the flow-diagram shown in FIG. 4 which will be described below.

Figure 4:
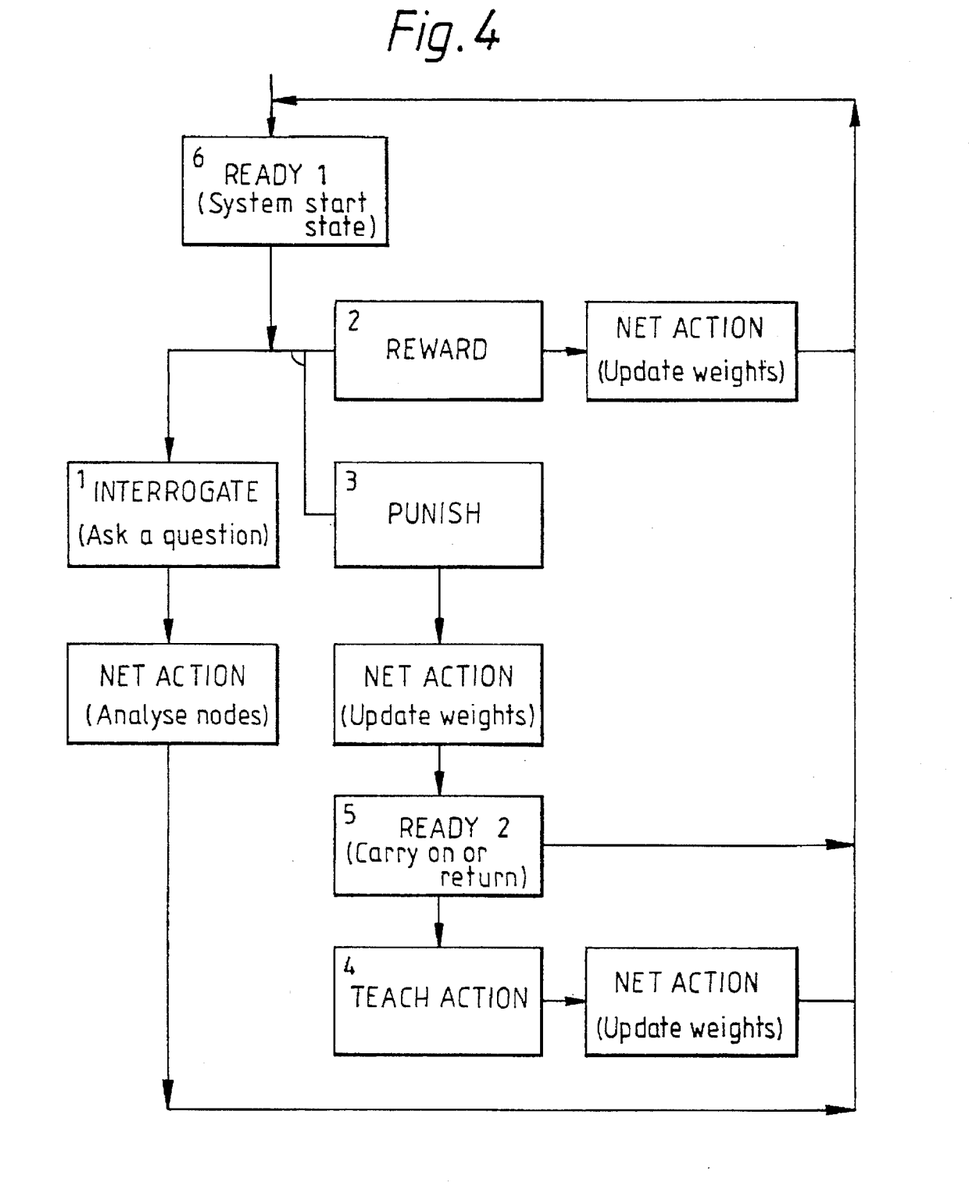

Referring to FIG. 4 the algorithm works as follows;

Ready1: At position 6 in the interaction cycle the system is in its start state and the user has the choice of proceeding via 1, 2, or 3.

Interrogate: At position 1 of the interaction cycle assume the net configuration is as shown in FIG. 2a.

A new input is given to the net which excites some of the cells in the input layer, say a2, a4 and a6, and instantiates (i.e. creates by storing feature data for) two new cells a8 and a9. The cells (a2, a4, a6, a8, a9) which together store the entire input data sequence are known in the net as the current short term memory (CSTM) and are conveniently provided in RAM. Several cells in the output layer (b1, b3 and b4) are excited by the firing of the input cells via appropriate existing interconnections eg (a2–b3, a4–b4, a6–b1 and a6–b3 ). The output layer behaves exactly like a cluster in competitive learning (Rumelhart & Zipser 1986) in that one cell then dominates all the others and inhibits all outputs except its own. (In principle this could be done by fully connecting the outputs layer with inhibitory connections, and using some feedback system to stabilize the net when only a single cell remains firing. In practice this is cumbersome, and does not contribute to either the ease of implementation or the understanding of the net behaviour, so a simple global function which identifies the cell which fires most strongly is applied, for the purpose of simplification). Suppose it is b1 that dominates in our example. This cell then fires and produces a certain action in the net. This action will normally mean printing an output, but could equally lead to other things. Unlike known competitive learning algorithms there is no weight modification at this stage. The program now returns to Position 6. The supervisory aspect of the net is brought into play at this stage. The supervisory program, or user, decides whether the net has made a correct or incorrect response. In the event that the response is correct the net can either be left unmodified, or it can be "rewarded" (i.e. modified to encourage this response). If the response is considered incorrect then the net should be punished, where punishment is a weight modification process which makes the incorrect response less likely for the given input. In the event that the response is considered neither correct not incorrect then the net can be left unmodified and further inputs can be tried.

Figure 2B:
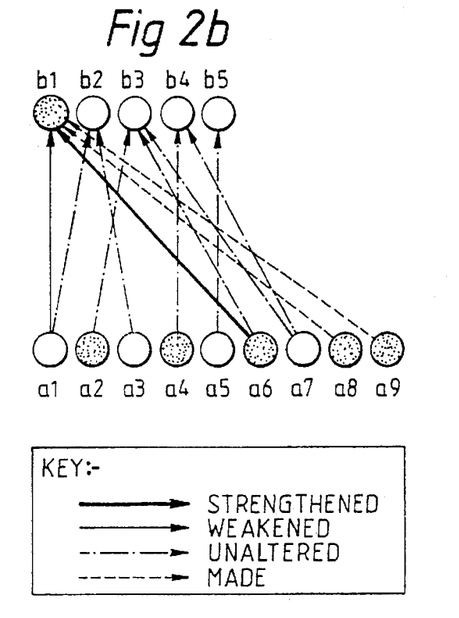

Reward: At position 2 assume the net is as shown in the example in FIG. 2b and has output the correct response. The user rewards the net, and the connections are modified in the following way:

Connections to the excited output node which are not carrying a signal are weakened eg a1–a1.

Connections to the newly instantiated nodes are made eg a8–b1, a9–b1.

Connections to excited output nodes which are carrying a signal are strengthened eg a6–a1.

Other connections are unaltered.

The algorithm then returns to 6.

Figure 2C:
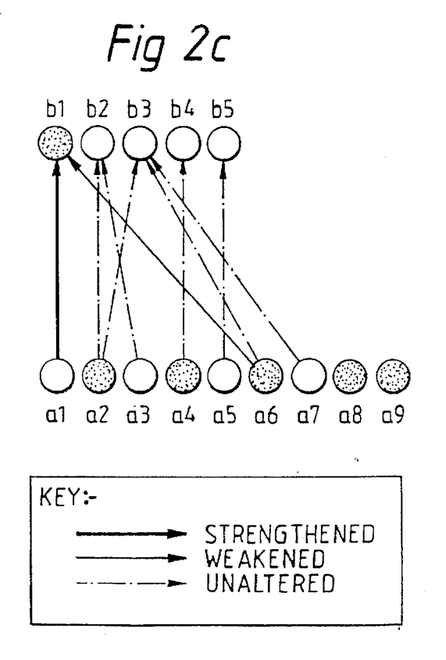

Punish: At position 3 in the interaction cycle, the net as shown in FIG. 2c, has produced an incorrect response, so the user punishes the net, and the connections are modified in the following way:

Connections to excited output node which are not carrying a signal are strengthened eg a1–b1.

Connections to excited output node which are carrying a signal are weakened eg a6–b1.

Other connections are left unaltered.

The cycle then proceeds to Position 5.

Ready2: At this stage it is possible either to proceed to position 4 or return to Position 6.

Figure 2D:
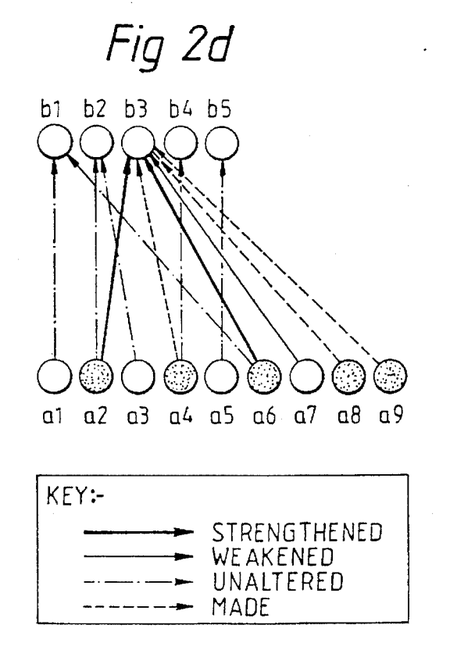

Teach: At Position 4 the user gives the expected output for the net to learn: for example assume that b3 is the expected output as shown in FIG. 2d.

Teach proceeds as for reward above—making connections between all CSTM input cells and an expected output cell which do not already exist eg a4–b3, a8–b3, a9–b3, a6–b3.

Other connections to a given cell are weakened, eg a7–b3. The program then returns to position 6.

Weight Modification

The method of altering the weights is a modification of the method used in competitive learning, (Rumelhart & Zipser 1989) except that instead of strengthening connections in such a way as to reinforce the existing tendencies of the net as is done in competitive learning, the procedure is controlled so that only desired responses are strengthened and undesired response are weakened.

In competitive learning it is usual to normalize the weights, but in the DTN a different strategy is adopted, as shown in Equation 2

$$W_{new} = \left[ 1 + \frac{\mu\delta}{1 + (\mu\delta\, W_{old})^4} \right] W_{old} \quad (2)$$

where $\partial=+1$ causes strengthening, and $\partial=-1$ causes weakening, $\mu$ governs the positions of the maximum.

Figure 5A:
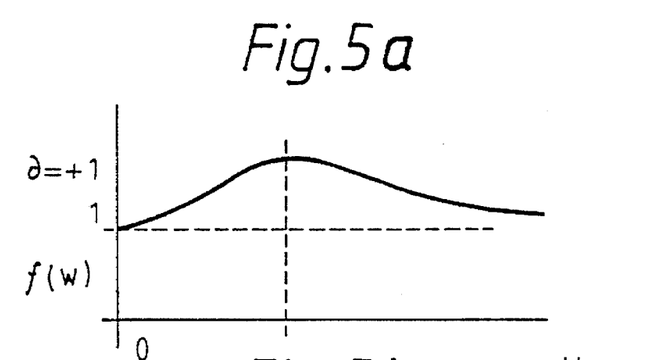
Figure 5B:
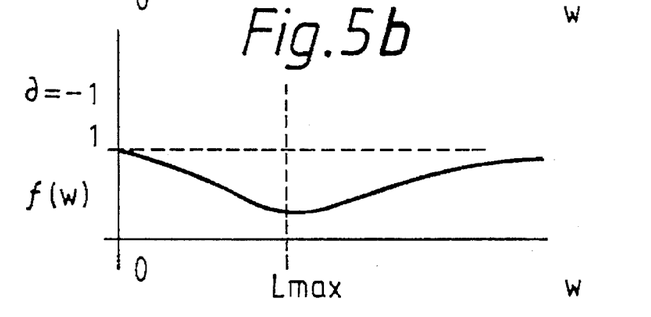

FIGS. 5a and 5b show graphs of this weight modification function, for strengthening and weakening. The effect of this weight modification function is that when first instantiated weights are easy to alter (because the weights are around the minimum of the function), but when a lot of weakening or strengthening has taken place the strengths tend to saturate, and do not easily increase or decrease. This prevents weights from becoming too dominant, but ensures that if a weight has been constantly strengthened it is not easily weakened. Unlearning is therefore difficult, though possible. This weight modification method is also applicable to known types of neural network, for example MLP networks.

As it stands the net described above is capable of useful associations, and was initially used as a top-down contexter in a scene understanding program. In, for example, a scene in which ships and water have been detected, an overall candidate for the type of scene (a harbour, say) could be determined using the net, and any large objects including vertical and oblique lines could becomes candidate cranes to be tested using a bottom up process. The net has no sense of structure of the input, at this stage, so that it cannot distinguish between, for example, (boat water crane) and (crane boat water). This is not a fatal weakness as far as the contexting purpose is concerned, but for other experimental applications, such as limited domain translation, the inability to distinguish between, (what time is the next train from London to Harwich) and (what time is the next train from Harwich to London) would have been unacceptable.

In embodiments for language processing and similar order-dependent input data, the net therefore needs some means of retaining the order dependence.

In one embodiment this flexibility is achieved by creating new input nodes each responsive to more than one feature. Thus, when a sequence of training data is input, it is temporarily stored in an input buffer. As in the simple embodiment, known features (for example, words of a sentence) cause certain input nodes to fire and certain new nodes, responsive to new features, may be created, as discussed above. Then, in this embodiment of the invention, order information is captured by forming further new nodes each responsive to a plurality of features in the input data sequence; preferably each plurality is a contiguous subsequence.

For example, if the training data sequence is a sentence, this embodiment captures the order information by forming contiguous pairs, triples, 4-tuples etc. of preterminals (or words) and storing each of these in an input node.

In the sentence "lazy cats sleep in the hot sun", for example, the pairs "lazy cats", "cats sleep", "sleep in" etc; the triples "lazy cats sleep", "cats sleep in", "sleep in the" etc, the 4-tuples "lazy cats sleep in", "cats sleep in the" etc could be formed, and stored in short term memory, and corresponding nodes may be formed for some or all. Such nodes will preferably be removed from the net if not encountered subsequently during training.

Figure 6:
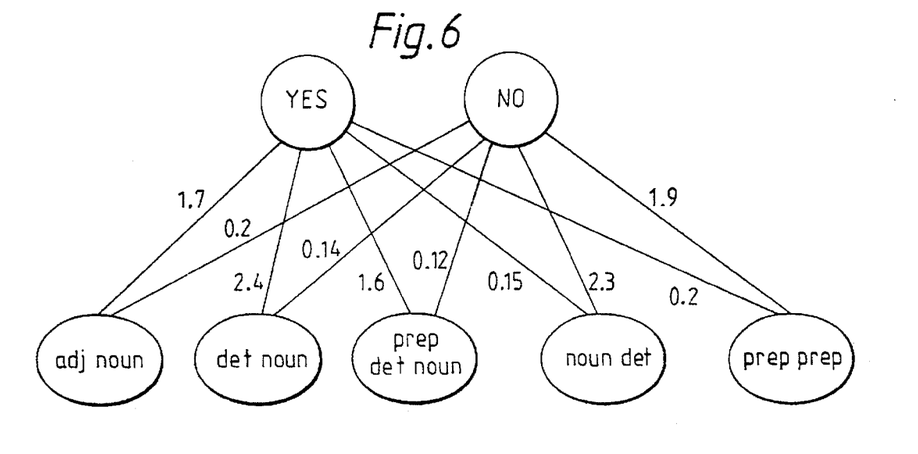
FIG. 6 shows schematically an embodiment of the invention for grammaticality checking.

FIG. 6 shows a portion of a net according to this embodiment after training on the problem of deciding whether a given sentence is grammatical. (In a typical case there could be 30 or 40 nodes in the input layer after training on the grammatically problem, or thousands of nodes after training on the problem of language translation).

The algorithm or mode of operation of this embodiment during training will now be outlined, taking the grammaticality problem as an example. The training file consists of a set of positive and negative sentences of preterminals, each one followed by its correct classification yes or no (the "desired response" in the program). One presentation of a sentence leads to the following sequence of operations (the "main cycle"):

1) The training data (sentence) string is read from the file
2) All possible tuples are generated in short term storage (between the minimum and maximum tuple lengths specified by the supervisory program or user)
3) Some of these tuples are selected for incorporation into the input layer. The selection is discussed below in detail, but is essentially pseudo-random: the probability of selection depends on several factors to be discussed below, and also upon the tuple length (the longer the tuple, and less likely to be selected)
4) Each input node matching any of the generated tuples is activated (i.e. fired), and the activations of the output nodes are calculated by a simple weighted sum of the active nodes
5) All tuples selected in step 3 are added to the input layer to form new nodes (if they are not already present)
6) The input layer is pruned of nodes which have not been very "useful", i.e. infrequently activated over the preceding cycles
7) The most active output node is found, and designated "current output_winner"
8) The desired response is read from the file. If this is the same as the current output winner, the latter is simply marked "desired_response_node" as well. If it is not the same, then this node is added to the output layer if it does not already exist, and it is marked as "desired_response_ node"
9) Links are created if necessary between all active input nodes (including the ones just added) and the desired response node
10) Weights of links are adjusted according to the learning method described above (with $\mu=1$, for example).

As more and more sentences are presented during training, the input layer first grows and then reaches a state of dynamic equilibrium where nodes are being lost as fast as they are being added. The training regime can be either "brute force" where on simply runs through the entire training set time after time until performance is judged satisfactory, or "incremental" where sentences from the complete training set are only added to the current training set when performance on the latter is satisfactory. (What is "satisfactory" is something to be discovered experimentally, with reference to performance on the test set. It was usually found best to demand only 90% performance on the training set rather than 100%, since this gave considerably quicker training and hardly degraded performance on the test set.

As stated above, the training can be either "brute force" or "incremental". Brute force training is the standard mode of training neural nets (particularly MLPs) where one simple cycles repeatedly through the entire training set. Although this appears to work perfectly well for MLPs, it does not work at all well for this embodiment with training sets larger than toy size (the difference is thought to be linked to the different weight adjustment methods used). Even a training set of 40 strings could not always be learned easily using brute force training.

It is therefore preferred to use an "incremental" training method, in which the network is trained on a first set of training data sequences, and after training is complete only then the set is expanded. Training data sequences may be added to the set one at a time or in steps of several sequences. The net retrains after each expansion of the training data sequence set. In general, the larger the incremental stepsize the less the total number of presentations required for learning a training set, but if the stepsize was made too big then learning would become slower again. The optimum stepsize must be found by trial and error, since it is data dependent.

This incremental training method is also applicable to other embodiments of the invention, and to other types of neural network (eg MLP networks) but is preferably used in combination with the above weight adjustment method.

As discussed above in step 3, not all tuples of an input data sequence will always be stored because in many domains the number of input nodes would grow too big for practical computation if this were done. Some means of selecting for storage only some of the tuples is required. The simplest solution would have been to store every second or every third tuple encountered during training, say, but this is usually too crude a criterion. A probabilistic method of storage was therefore developed, with the probability varying during training in the way described below.

The probability of incorporating a tuple of length n into the input layer depends on p (a global variable to be described below) and n. At present, this embodiment uses a simple power law: the probability of incorporating a tuple of length n is p. Thus is p=0.8, the probability of creating a singleton is 0.8, of creating a pair is $0.8^2=0.64$, of creating a triple is $0.8^3=0.512$, etc. up to the maximum tuple length specific. More sophisticated probability distributions could be considered. The rationale behind the power law is that the longer tuples are in a sense more "specialized" and not so generally useful as the shorter ones for selecting the desired output node.

It turned out that for simple problems on grammaticality and translation that it was simplest to keep p fixed at 1.0, i.e. to store all tuples encountered during training, up to the maximum tuple length. This was computationally feasible as long as one only stored short tuples—up to a maximum length of, say, 3. The advantage of this approach is that one does not have to worry about very useful tuples being thrown away due to chance. However, probabilistic storage will be required in order to learn larger data sets containing more tuples.

P will also depend on global net parameters. A first such parameter may be termed "complacency". Complacency is related to the length of the current sequence of correct answers. If the net is responding correctly we do not wish to add many new nodes. This general principle is also applicable to all other embodiments of the invention. In this embodiment complacency causes p to decay exponentially as the correct sequence grows in length, then return to its original value when a wrong answer is produced.

A further parameter, which may be termed "experimence", is related to the total number of nodes in the input layer. We do not wish to add nodes without limit when the net is already big, so experience causes p to decay exponentially with respect to the number of input nodes. Complacency is useful in a situation where the net has been exposed to part of a very large data set during incremental training, which was already sufficient to make the net perform at a very high level in the particular problem area. The idea is that the rest of the data set will not "clog up" the input layer by causing the addition of many more superfluous input nodes. However, in many types of situations, the training data set is not large enough to make the use of "complacency38 essential. The use of "experience" could potentially cause problems if the net had already grown large, thus making tuple storage less likely, but had not yet learn a training set. In such a case it might never learn the training set. It is therefore important to ensure that p only decays extremely slowly with experience.

This embodiment of the invention is, as stated above, useful in language processing problems (although it may also be used for other types of data having a feature order dependency) and may, for example, be used to train a phrasebook-type language translation device.

As advantage of such a neural net approach to translation would be that a net could be trained by anyone who spoke both source and target language, with an appropriate method of data collection, and would not require skilled programming by language experts. In cases where it is economic to spend a lot of resources on a powerful translation program, for example in a Japanese-English context, it would be feasible to implement an elaborate classical language translation algorithm. In cases where languages spoken by smaller groups of less economic strength are involved, it may well be advantageous to use a neural net aided translator. Any such net could, of course, produce the intended output phrase in the source language as well as the target language so that serious mistakes could be filtered out.

Another simple method for giving the inputs some ordering information, in which it was possible to associate an absolute position with each symbol (for certain symbol sets) is as follows.

For example if the multiple inputs L O O L L O L L were input, the net included a preprocessor which converted them into L1 O2 O3 L4 L5 O6 L7 L8, which can then be treated as a single binary input (10011011).

This has the drawback of giving the net a notional rigidity—since it makes sense to then consider inputs of a fixed length—but it is no more rigid than a multi-layer-perceptron for example, although a more flexible way of introducing order is desirable.

The use of the above types of input layer are found effective for certain types of problem. For higher level problem, use of hidden or intermediate layers of nodes between the input and output layers is often an effective solution. Although this could be of a conventional kind, networks according to a further embodiment of the invention have the additional capability of creating (additional) internal nodes (i.e. in an intermediate layer) to cope with what appear to a single layer net to be contradictory inputs. If such nodes were created too frequently, and for cases where a single-layer net could cope if enough training were given, then the net would soon be swamped with a large number of unnecessary internal nodes, and what would have been created would be equivalent to nothing more than a very large memory. If on the other hand such cell creation is usually only performed when necessary, to cope with complex data, then a net with such a capability can learn difficult problems without using excessively large amounts of memory. Mechanisms whereby such extra nodes can be introduced sparingly, but appropriately will now be discussed.

A global parameter equivalent to the "complacency" parameter above is employed (in the following, this version of the complacency parameter will be termed 'Cell Creation Excitation' or 'CCE').

CCE is conveniently related to the number of punishments the network has historically received during training compared to the number of interrogations. If the network has given many correct answers and hence received few punishments the network will have a low CCE and will be unlikely to create, or instantiate, any new cells. In the event of it having received a lot of punishments the network gets into an excited state with a high value of CCE and will frequently instantiate new cells.

Figure 7A:
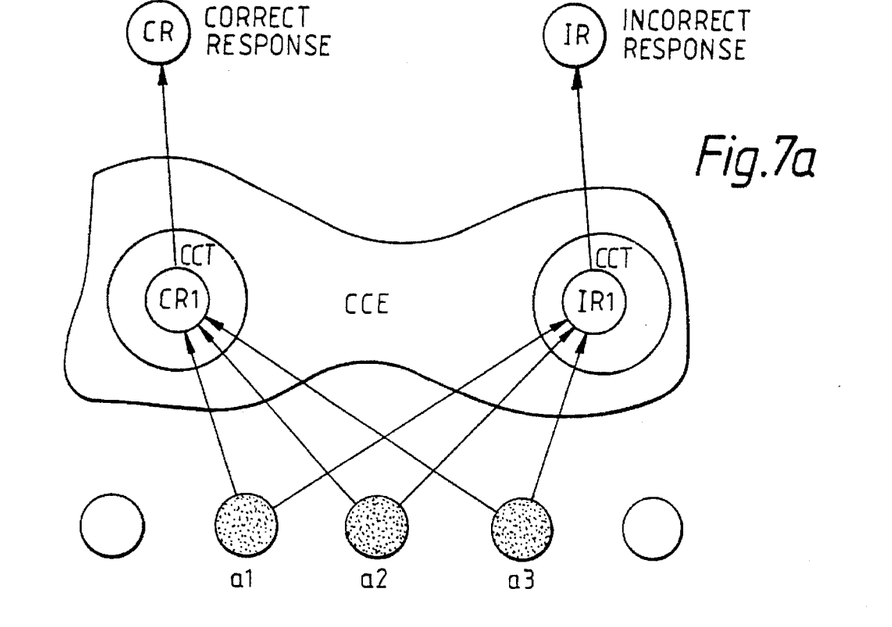
FIGS. 7a and 7b illustrate a net according to a further aspect of the invention during subsequent stages of training.
Figure 7B:
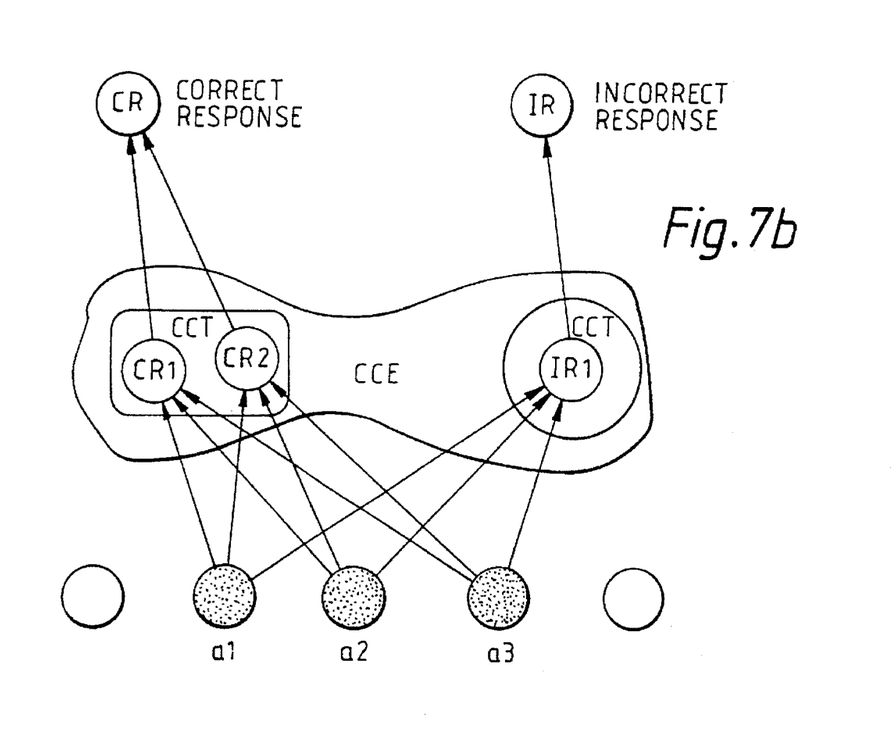

FIG. 7a shows a part a network according to this embodiment, comprising two output nodes CR (correct response) and IR (incorrect response), an input layer including three input nodes a1, a2, a3 and two intermediate layer nodes CR1 and CR2, each connected to each of the three input nodes via respective weights (not shown), and to one of the output nodes. Several intermediate layer nodes may, in general, be connected to one output layer node. A group of intermediate nodes connected to a common output node is termed a 'cluster'. When an input signal held in short term memory contains the 3 features to which a1, a2 and a3 are responsive, the correct response should be for cell CR1 to fire, triggering output cell CR, but assume that this is not the case, and that IR1 fires instead, triggering incorrect response IR. The supervisory program punishes the net and connections are varied according to the algorithm described above with reference to FIGS. 5a and 5b. The net is then "told" that the output CR was correct, and further tests take place. The highest output of those nodes in the cluster connected to CR at the time of output-determination (in this example, since there is only one, it is that of CR1) is compared with that of the winning excitation which is that of IR1. The following logical step is then mode:

If Excitation (CR1)<T.(Excitation IR1)), where T=T(CCE, other parameters*), then a new cell, CR2, is instantiated and connected to CR, and appropriate connections made as shown in FIG. 7b, so that CR2 gives the correct response, by causing CR to fire.

A further parameter*, termed the cell creation threshold (CCT) governs the level of excitement that is required to increase the size of the particular cluster to which it applied, and is related to the number of cells in that output cluster. If the cluster is large, it will be resistant to the creation of new cells. This means that the net will not instantiate cells very easily in a large cluster, so that there is a natural tendency towards economical use. In one example, the network described above was simulated on an IBM AT using muLISP. Two kinds of input were tested on the network: English sentences and phrases, and binary inputs.

English Phrases and Sentences

Figure 8:
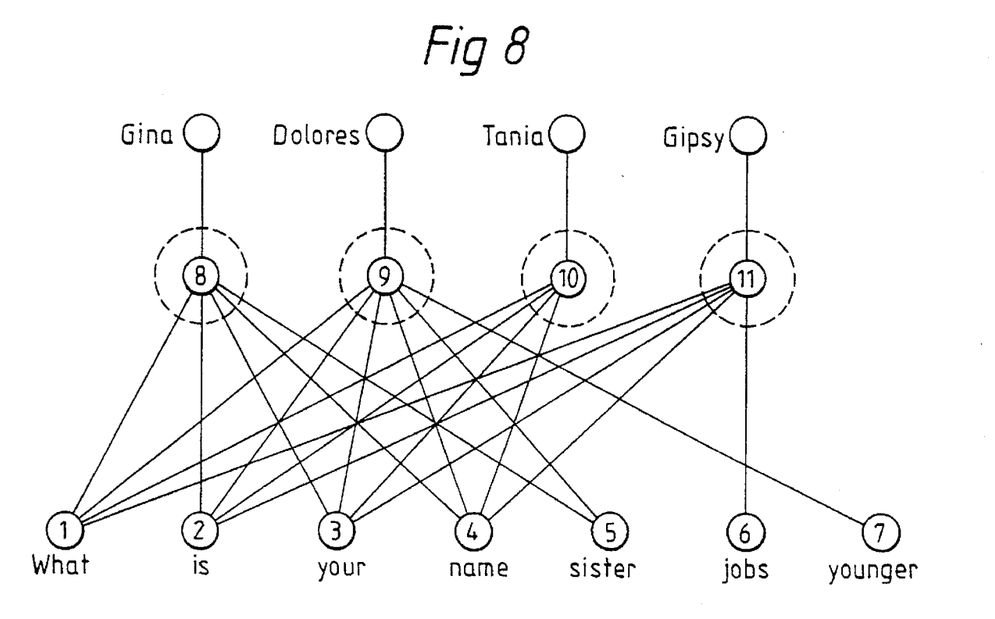
FIG. 8 illustrates a net according to this embodiment trained to solve one problem.

The network could learn to respond correctly to a large range of inputs in which deviation from the training inputs was permissable, and yet small but significant changes to the input were correctly interpreted. A sample example of a well trained net is shown in FIG. 8. Sentences were taught so that the net learned the following set of responses:

"What is your name?:"—"Tania"
"What is your sister's name?"—"Gina"
"What is your younger sister's name?"—"Dolores"
∓What is your jog?"—"Gipsy"

It should be noted that with this easy set of inputs no clusters were formed, and the intermediate layer is not more than a set of single cells. Inputs with minor variations, such as "Whats your name"? or "What job do you do?" are correctly interpreted, of course.

Some variants of the net may allow punishment without subsequent teaching. In such cases it is possible, for example, to teach the net to respond to the input "What is your name" with, say, "Lizzie". A further period of training can teach the response "Elizabeth". If the net is then repeatedly asked to give its name, and punished when the reply "Elizabeth" is given, though without a correct response being taught, it ultimately reverts to its former name "Lizzie".

In summary the network training is able to store a vocabulary, and organize connections between items in the vocabulary in such a way that while unimportant variations in the input are correctly ignored, significant variations are correctly interpreted. The network responded quickly to any input even after it had learned moderately large vocabularies of input words (about four hundred).

Binary Inputs

XOR problem

Figure 9:
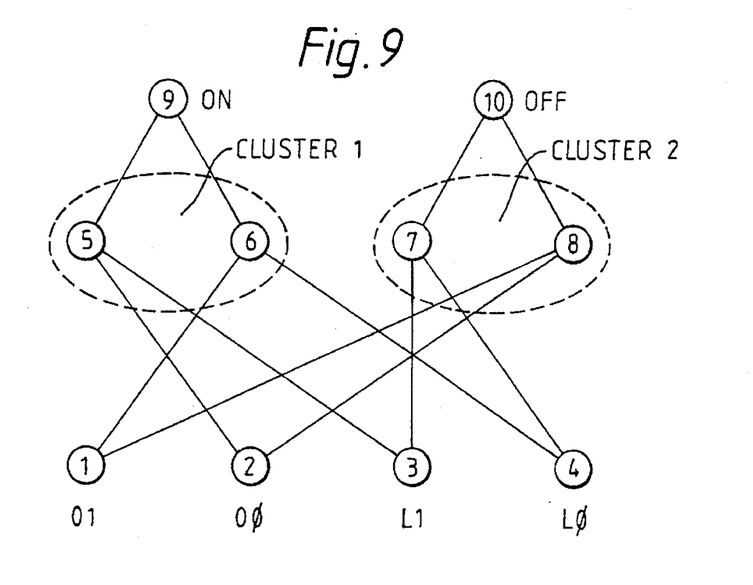
FIG. 9 illustrates a net according to this embodiment trained to perform the XOR logic function.

FIG. 9 shows a net which has been taught to solve the XOR problem. The four inputs L1 L2 O1 and O2 are used to generate the logical inputs 11 10 01 and 00, as described the (LOOLLOLL) example above, so that for example the input (L1 O2) represents 10. (This representation can be made more neural with an extra layer of two input cells if numerical binary inputs are desired). It will be noted that in this case two clusters of two cells each formed in the intermediate layer. In this case the XOR problem is solved by instantiating these four intermediate cells which prevent the hunting back and forward which must inevitably occur when only a single layer net is used, and precluding the necessity for the thousands of iterations required by a multilayer perceptron (MLP) with back-propagation (Rumelhart, Hinton & Williams 1986) to solve the XOR problem. It can be seen that a reduction in processing time has been obtained in exchange for an increase in memory. In practice three internal nodes are sometimes adequate to solve this problem, and at the other extreme with a bad training method as many as five are instantiated—with some obviously redundant. An algorithm for reclaiming memory wasted in this way is therefore desirable (but not necessary). It can superficially appear that to use so many cells to solve the XOR problem is counter productive, in that one might as well merely store the inputs and outputs as memories. In fact it is the ability of the net to decide for itself when features are worth storing in this way which gives it its power. As is shown below, some problems which involve much larger input patterns may have the XOR problem implicitly contained in them. In such cases although there may be many input nodes, only four intermediate nodes are formed, so that the solution seems to consist of a few memorized cases generalized to allow recognition of all patterns, which is a very efficient use of memory.

The two nets of FIGS. 8 and 9 were actually parts of the same net, which formed two completely independent subnets since there was no overlap between the sets of inputs and outputs. If it were wished to train the same net to solve some other logic function, then during training, instead of inputting only (L1 O2) for example, the input (XOR L1 L2) would be used, and this input associated with the XOR output. Then for example the OR function can be trained by using inputs like (OR L1 O2) with the appropriate output. This method allows the net to learn to handle inputs in different ways according to the wishes of the user.

Parity Problem

The network described could solve the third order parity problem when trained in a similar manner in somewhere between three and seven complete cycles of presentation of the eight input states.

Blob Finding in Video Images

Using inputs in the form of a two-dimensional input pattern, the network was trained to decide whether a cluster or blob of ones was generally north, south, east or west, and the successful results of the training are shown.

Implicit XOR

The network could also generalize its ability to solve the XOR problem, to solve pattern recognition problems where a disjoint region in a two-dimensional space is hidden in a sixteen dimensional space.

The lower two entries show noisy patterns being correctly identified. In this case it was established that four internal nodes were instantiated to cope with the complex training set, but all subsequent inputs excited one or other of these internal nodes, to produce correct output without further proliferation of internal nodes. This seems to offer great promise, since it avoids the enormous amount of processing required by, for example the MLP, and produces the correct answers by the extra, but economic, use of memory.

Connections within layers could be implemented in the invention, as there is evidence that permitting such interconnection is useful.

Thus, two particular ways of generalizing the invention are possible, one in which intra-layer connections are permitted, and one in which the competition among outputs is performed by lateral inhibition rather than a global maximum function, so that more than one output cell may fire.

From the foregoing, it will be apparent that a hardware embodiment of the invention, in which each node in the intermediate and output layers is a simple parallel processor capable of summing inputs from the nodes of the layer below weighted by corresponding weights, is straightforward to design. Suitable hardware is discussed in the literature and may, as discussed in our international application published as WO 89/02134, and which is herein incorporated by this reference, be analogue, digital or a hybrid of the two. Also necessary during training is a more general purpose computing device, for example a microprocessor or DSP (digital signal processing) device, programmed to train the network by instantiating new nodes and adjusting weight values.

Alternatively, the invention may be realized as a computing device (a microprocessor, or preferably a DSP device) programmed to perform the parallel hardware functions (as parallel program branches) sequentially.

Finally, it is observed that networks trained according to the invention may be marketed, for specific applications such as phrasebook translations, as a trained device without the training means. Such devices will in general reflect the fact that they have been trained using the invention, and will hence not resemble known networks in their architecture; for example, nodes instantiated towards the end of training will be more sparsely connected.

We claim:

1. A trainable artificial neural network comprising:

input layer means for inputting sets of data items and generating node outputs, each node output corresponding to an occurrence anywhere in a set of a respective predetermined data item;

output layer means for responding to the generation of said node outputs by producing at least one net output, each net output depending upon a plurality of such node outputs weighted by corresponding weight values;

means for storing given data items in said set, each given data item stored not corresponding to any said respective predetermined data item; and means for causing said input layer means to thereafter generate node outputs corresponding to occurrences in a said set of respective said given data items.

2. A network according to claim 1, in which each said set of data items is in the form of a sequence of the corresponding data item and said given data items are predetermined subsequences of said predetermined data items in said sequence.

3. A network according to claim 2 in which said predetermined subsequences comprise predetermined data items occurring contiguously in said sequence.

4. A network according to claim 2 in which said predetermined subsequences comprise fewer than a predetermined number of said predetermined data items.

5. A network according to claim 2 in which said predetermined subsequences are a subset of subsequences of said predetermined data items occurring in said sequence, the probability of a given subsequence being included in the subset decreasing with increasing subsequence length.

6. A network according to claim 1 further comprising means for inputting sequences of data items and generating said sets of data items, each generated set of data items corresponding to an inputted said sequence and comprising representations of respective data items in the corresponding sequence, each representation being indicative of both the identity of the data item it represents and the position of the data item in the sequence.

7. A network according to claim 1 further comprising control means for inhibiting said means for causing in dependence upon variable criteria.

8. A network according to claim 7 in which one of said variable criteria corresponds to the number of node or intermediate outputs.

9. A network according to claim 8, in which a criterion corresponds to the number of intermediate outputs to which a given output means output is responsive, whereby each given output means output is constrained not to receive more than a predetermined number of intermediate outputs.

10. A network according to claim 8 in which a criterion corresponds to the number of node outputs already available so as to constrain the input layer means not to produce more than a predetermined number of such node outputs.

11. A network according to claim 7 in which one such criterion corresponds to a recent historical performance of the network, such that a good historical performance will tend to inhibit said means for causing.

12. A network according to claim 1 including means for causing said input layer means to cease to generate a node output corresponding to an occurrence anywhere in a said set of a data item which has, over a relatively long interval, not been present in inputted sets of data items.

13. A network according to claim 1 in which the means for storing comprises means for temporarily storing said data and in which the input layer means comprises means for temporarily storing any said respective predetermined data item occurring in said set of data items, said network comprising a digital computer operating under stored program control.

14. A network according to claim 1 wherein each layer means comprises a plurality of nodes each comprising at least one input and an output, and means for producing a node output signal in dependence upon each input.

15. A method of training an artificial neural network having input layer means for inputting sets of data items and generating node outputs, each node output corresponding to an occurrence anywhere in a set of a respective predetermined date item, and output layer means for responding to the generation of said node outputs by producing at least one net output, each net output depending upon a plurality of such node outputs weighted by corresponding weight values the method comprising the steps of:

inputting training sets of data to the input layer means;

storing given data items in a training set, each stored given data item not corresponding to any said respective predetermined data item;

detecting said net output, and, in the event that a predetermined criterion of success is not met, causing said input layer means to thereafter generate node outputs corresponding to occurrences in said sets of data items of at least one said given data item.

16. A method of training a neural network having network inputs and network outputs defined by a plurality of weight values, said method comprising the steps of:

inputting training data and adjusting said weight values as a function of network outputs, an amount by which a given weight value is adjusted depending upon said given weight value such that the amount is less for both high weight values and low weight values than for weight values intermediate said high weight values and low weight values, whereby after frequent adjustments in a first direction, adjustment in opposite second direction has little effect and, after frequent adjustments in said opposite second direction adjustment in said first direction has little effect.

17. A method according to claim 16, wherein each weight $W_{old}$ is adjusted by a increment $\Delta$ given by the formula:

$$\Delta = \left[ \frac{\mu \delta W_{old}}{1 + (\mu \delta W_{old})^4} \right]$$

where $\mu$ is a constant and $\delta = \pm 1$.

* * * * *